United States Patent [19]
Kelly et al.

[11] 3,930,027
[45] Dec. 30, 1975

[54] PROCESS FOR PREPARING A PRECOOKED DEHYDRATED PRODUCT

[75] Inventors: Vincent J. Kelly; Larry L. Cloud; Wayne J. Smalligan, all of Fremont, Mich.

[73] Assignee: Gerber Products Company, Fremont, Mich.

[22] Filed: Nov. 16, 1973

[21] Appl. No.: 416,562

Related U.S. Application Data

[63] Continuation of Ser. No. 177,903, Sept. 2, 1971, abandoned, which is a continuation-in-part of Ser. No. 54,851, July 14, 1970, abandoned.

[52] U.S. Cl. .................................. 426/28; 426/463
[51] Int. Cl.² ............................................ C12B 1/00
[58] Field of Search ............... 426/18, 28; 195/31 R; 127/31, 32, 38

[56] References Cited
UNITED STATES PATENTS

| | | | |
|---|---|---|---|
| 2,266,051 | 12/1941 | Lebeson | 127/32 X |
| 3,551,293 | 12/1970 | Seidman et al. | 195/31 |

Primary Examiner—Raymond N. Jones
Attorney, Agent, or Firm—Townsend and Townsend

[57] ABSTRACT

A process for obtaining a dehydrated, readily reconstitutable cereal product by fully gelatinizing the starch in a portion of a cereal slurry, cooling the part of the slurry containing gelatinized starch, and thereafter subjecting the cooled gelatinized starch to enzymatic-induced hydrolysis, followed by further conventional processing to produce a dehydrated cereal product of superior reconstitution characteristics, and the novel cereal slurry required to obtain the aforementioned product.

8 Claims, No Drawings

PROCESS FOR PREPARING A PRECOOKED DEHYDRATED PRODUCT

This is a continuation of application Ser. No. 177,903, filed Sept. 2, 1971, now abandoned, which in turn is a continuation-in-part application of the copending patent application bearing Ser. No. 54,851, filed July 14, 1970, now abandoned and entitled "Novel Cereal Process".

This invention relates to the preparation of a unique precooked, dehydrated grain cereal product that can be either salt-free or contain a low salt content, as well as higher conventional levels of salt. More particularly, the process of this invention provides a dehydrated product that is rapidly reconstitutable with liquid to form a homogenous smooth textured cereal mass with the distinctive flavor of the original cereal grain and being especially suitable for infant feeding.

Precooked, dried products, which lend themselves to easy reconstitution or rehydration to yield a smooth, fluffy textured, edible mass when mixed with a liquid such as milk or water, have found increasing use in the feeding of infants and adults who require geriatric or post-operative care. Dehydrated products of this general type are available to the consumer in the cereal form. These dehydrated products can be produced by preparing a paste or thick suspension, i.e., a slurry or puree, obtained by heating the raw materials to form a pulp which may be strained or sieved to ensure uniform particle size. The slurry or puree is then applied to the surface of conventional drying equipment such as a drum dryer, where substantially all (90–98%) of the water contained therein is removed. The dried product is conveniently flaked and packaged for use.

One conventional process for precooked, dehydrated grain cereal production involves the initial controlled heating of a slurry of raw (or steamed) cereal grain to a temperature suitable for the simultaneous gelatinization of the starch molecules present and where enzyme activity can accomplish the conversion of the gelatinized starch to dextrins and sugars. This enzyme process results in an increased cereal production rate and a product that is reconstitutable with an amount of liquid that is readily ascertainable and, most importantly, reproducible. However, such a conventional process suffers from the disadvantage of requiring close control of processing variables such as enzyme concentration, concentration of the solids in the cereal slurry, reaction temperature, reaction time and ultimate dryer speed when dehydrating the slurry into a continuous cereal sheet. Furthermore, in such conventional processing it has been shown that the salt in the formula does more than merely enhance the flavor; it also aids in the drying operation, particularly for rice cereal. However, since evidence has recently been presented which tends to show that excessive salt in the diet may cause hypertension, it has been desirable to investigate cereal formulas with both reduced and completely eliminated salt content. Attempts to eliminate salt from the slurry have heretofor resulted in completely unsatisfactory moisture evaporation rates for the cereal slurry.

It has now been found that the salt concentration of the grain cereal slurry can be substantially reduced or actually entirely eliminated, without adversely affecting the ultimate product quality or overall efficiency of product dehydration, by completely hydrolyzing a portion, e.g., from about 30% to 70%, by weight, of the total starch in the slurry composition. Furthermore, it has been found that improved results are obtained whether the remaining non-hydrolyzed starch is separated prior to initial gelatinization and then returned to the slurry in an ungelatinized form prior to enzyme hydrolysis, or separated after total gelatinization from the slurry portion to be hydrolyzed and thereafter re-added to the hydrolyzed portion of the slurry when enzyme conversion has been completed. With either procedure, the resulting slurry is readily dried and exhibits highly desirable reconstitution characteristics including an appetizing flavor.

Grain starch granules are formed of two basic types of starch molecule, i.e., the linear maltose polymer-amylose and the branched maltose polymer-amylopectin. The size of the maltose polymer and the amount of each type of the polymer that is present in the starch granule determine the specific properties of the individual starch. Both types are normally synthesized by and are present in plants. Most starch granules, as produced by nature, contain approximately 20 to 30% of the amylose-type molecule, with the balance being amylopectin-type molecules.

The starch granules are formed by attractive forces between these large carbohydrate molecules, i.e., the linear portions of the molecule tend to associate together into micelles which bind the various molecules together into a crystalline-like structure. Such a structure is fairly rigid and insoluble in cold water. However, when the temperature of a suspension of starch in water is increased to or above a critical point, called the gelatinization temperature, water penetrates the granules, causing them to swell and produce a viscous mass. Gelatinization temperatures vary from about $140°–167°$ F depending upon the particular type of starch involved. By increasing the temperature above that required for gelatinization, i.e., to about $220°$ F, adequate gelatinization of the cereal grain is thus insured.

Treatment of gelatinized starches with an enzyme such as amylase converts the starch, i.e., hydrolyzes it, to produce lower viscosity types of molecules such as dextrins and maltose. Ultimate enzyme conversion with an enzyme such as amylase results in the starch molecule being depolymerized to maltose and, depending upon the structure of the starch, various higher sugars such as maltotriose, maltotetrose, etc. The present novel process involves conventional gelatinization and subsequent hydrolysis, but in a manner whereby the ultimate portion reduced to dextrin and maltose is readily controlled within the concentration required to obtain satisfactory slurry properties and reconstitution characteristics, even in the absence of conventional concentrations of salt. The susceptibility of the ultimate packaged cereal product to caking when subjected to storage humidities in excess of 70% relative humidity is directly related to the maltose content. By employing the present process, maltose concentration is readily controlled at the optimum concentration of about 14%. Thus, when the enzyme is allowed to react on previously gelatinized starch molecules, cooled to a temperature in the range of normal enzyme activity, the time of reaction, the enzyme concentration and the temperature of the reaction do not require the precise control that was heretofor mandatory in conventional gelatinization/hydrolysis cereal processes.

Although the present invention is not intended to be limited to any specific theoretical concept, it appears that enzyme hydrolysis is limited to that portion of the cereal slurry starch that has previously been gelatinized. Furthermore, by heating the starch slurry to a temperature significantly above the gelatinization temperature of the starch, i.e., in about the range of 160°–220° F, not only will all the starch present be gelatinized, but any naturally occuring enzymes will be in part permanently inactivated or destroyed. The process of this invention is particularly useful where the grain requires high temperature gelatinization, higher than the inactivation temperature of most diastatic enzyme systems. Thus grains such as long grain rice can now be utilized more readily in cereal preparation.

As a result, subsequent quantity control of the amount of gelatinized starch that is allowed to be subjected to enzyme conversion, will enable the hydrolysis to be conducted without stringent process conditions, i.e., hydrolysis of the gelatinized starch can go to completion. The ultimate effect of such uniformly complete hydrolysis appears to be that the dextrins are more completely hydrolyzed. Therefore, dehydration is not dependent on the presence of salt as an aid thereto.

Turning now to the process in more detail, two alternative procedures have been found to be satisfactory. The first involves dividing a slurry of ungelatinized starch into a first and second stream in a ratio of about 3–7:7–3, and preferably about 30–45 to 70–55. The second stream is independently subjected to high temperature gelatinization. Thereafter, the hot gelatinized starch slurry is cooled by incorporating therewith the first stream of unheated ungelatinized starch. The combined starch slurry is then contacted with an enzyme and the gelatinized portion converted to the hydrolyzed product. Finally, the converted starch-containing slurry is subjected to conventional dehydration such as on a drum dryer.

The alternative procedure which has been found to be similarly effective in overcoming the shortcomings of prior art processes involves the initial high temperature gelatinization in the total cereal slurry. Thereafter, the gelatinized starch is divided into a first and second stream, the second stream cooled, for example, in conventional heat exchange equipment such as a line heat exchanger to a temperature of approximately 90° F. The cooled stream is then subjected to enzyme conversion. Upon completion of enzyme hydrolysis, the streams are recombined and subjected to conventional dehydration such as on a drum dryer. Where hydrolysis can be carried out at temperatures of 80° F or lower, satisfactory results have been obtained without dividing the gelatinized starch into a first and second stream, but in allowing hydrolysis to occur upon the total slurry.

Conventional drum drying involves the application of a liquid material in the form of a solution or slurry to a revolving heated metal drum that conducts heat to the wet material during a partial revolution of the drum to reduce the water content thereof by evaporation. The dried material is thereafter scraped from the surface of the drum by a stationary knife (doctor blade) spaced around the drum periphery from the point of application by an arcuate distance corresponding to that desired to allow for drying. In this manner, the product is exposed to heat during the brief time required for the drum to rotate around this arc between the point of application and the fixed location of the knife.

In the fluid cereal slurry industry, the drying is usually accomplished with atmospheric double drum dryers, i.e., a pair of closely spaced cylindrical drying surfaces that are heated internally such as by steam. Drums are conventionally employed that have the same radius and are in parallel alignment with their axes of rotation on the same level.

The cereal slurry to be dried is disposed as a "puddle" or pool in the space (trough) formed between the upper adjacent surfaces of the two drums. The puddle, normally in direct contact with the upper adjacent surfaces of both drums, provides a thin film that is deposited on the drums as they rotate downwardly toward the nip formed between their adjacent outer surfaces. Drying of the film continues throughout the aforementioned arcuate interval while the sheet is in contact with the heated drum surface prior to being scraped from each drum by respective stationary blades. Flaking is either accomplished simultaneously with the scraping or is produced subsequently with separate apparatus.

It is advantageous for the dehydrated sheet to have a thickness of about 4–7 mils. However, the film thickness will obviously be dependent upon the space provided between the drums drier. In addition, the film thickness can be varied by modifications in drum speed and/or steam pressure within the drum. With respect to the steam pressure, conventional equipment advantageously utilizes steam in the range of 30–90 p.s.i.g. Tension or draw-off rollers may be employed to assist in the removal of the sheet from the drum surface.

The resulting dry cereal sheet can be prepared for packaging and ultimate consumption by flaking into various sizes depending, of course, on the re-hydration characteristics desired. The flaking can be accomplished on standard equipment such as a 10-mesh U.S. sieve series screen (0.030 inch wire).

The present invention is useful with any cereal grain flour normally modified with enzymatic hydrolysis. Typical examples, in addition to rice, include oat, wheat, corn, barley and the like, and mixtures thereof, in an amount of about 5–25%, and preferrably 10–15% by weight of the total weight of slurry formulation.

Any enzyme that hydrolyzes gelatinized grain starch can be employed in amounts up to about 1.0% by total weight of slurry formulation. Although higher amounts can also be used with no adverse affects, amounts in the range of 0.25–0.75% by weight are especially advantageous. The enzyme can be introduced into the cereal slurry either prior to gelatin (with the result that a portion of the enzyme is inactivated by the high temperature) or subsequent to gelatinization. Holding times for enzyme conversion have been varied from 10–25 minutes with satisfactory results.

The rate and completeness of hydrolysis of the gelatinized slurry is dependent upon temperature conditions as well as time of conversion (digestion). Although it is preferred to accomplish the conversion at about 120° F, the temperature can be varied, depending upon the amount of starch that has been gelatinized. For example, when only 30% of the starch is gelatinized, it is desirable to maintain a temperature of about 120°F. Conversely, when the gelatinized portion approaches or exceeds 50%, a lower temperature down to about 90° F can be advantageously employed.

The use of fluid milk, and preferably whole milk or non-fat dry milk powder in amounts up to 25%, and particularly from about 5 to about 15%, by weight of the slurry, can also be employed to significantly improve and enhance the natural flavor of the product.

Vegetable oils, such as soya oil, lecithin, sesame oil, rice oil and the like, may also be desirable ingredients when employed in amounts of about 1 to 3% by weight of the slurry. The vegetable oil also aids in release of the dried sheet, improves the general character of the sheet, and results in a more desirable flake.

The object of dehydrating is to remove as much of the water present in the puree as possible without detrimentally affecting its quality. Therefore, the final products envisioned by this invention usually contain at least 90% solids and preferably from 95 to 98% solids.

To further illustrate the novel process of this invention, the following examples are provided. It should be understood that the details thereof are not to be regarded as limitations as they may be varied as will be understood by one skilled in this art. The percentages included throughout this disclosure are based on the total weight of the formulation prior to cooking, unless otherwise indicated.

EXAMPLE I

A formulation was prepared in the following proportions:

| Ingredient | Quantity percent by weight* |
| --- | --- |
| Rice Flour | 70.0 |
| Rice Polish | 25.0 |
| Dicalcium Phosphate | 2.6 |
| Sodium Iron Pyrophosphate | .8 |
| Rice Oil | .7 |
| Vitamin Mix | .2 |
| Malt | .7 |
| | 100.0 |

*Solids content only

Sufficient water was added to reduce the overall solids content to about 22.6%. The slurry at about room temperature, was pumped through a line strainer having a screen size of 0.060 inch to an agitating heater at a temperature of about 210° F and held for about 15 minutes. The slurry was then removed and approximately two-thirds, by weight thereof, transferred to a holding tank and the temperature adjusted to about 90° F. After about 17 minutes at this temperature, the slurry containing hydrolyzed starch was recombined with the portion containing gelatinized starch and fed to a conventional double drum dryer, each drum operating at an interval pressure of 80 p.s.i.g. The drums were rotated at 5 revolutions per minute and the dried sheet easily removed with doctor blades. The resulting sheet was non-plastic, continuous and had a film thickness of about 5 mil. Similar tests were conducted with corn, barley, wheat and oat and mixtures thereof.

EXAMPLE II

Using the slurry formulation of Example I, a quantity of slurry was divided into 2 portions in about a 2 to 1 weight ratio. The larger portion was subjected to gelatinization as in Example I, at 170° F. Thereafter, the remaining ungelatinized slurry, still at room temperature, was added thereto, lowering the temperature to about 120° F. Hydrolysis was allowed to occur for about 20 minutes. The resulting slurry was again drum dried and the dehydrated sheet easily removed from the drum surfaces.

In each of Examples I and II, the resulting cereal was found to have excellent reconstitution characteristics and a highly appetizing taste.

Although the foregoing invention has been described in some detail by way of illustration and example for purposes of clarity of understanding, it will be apparent to one skilled in the art that certain changes and modifications may be practiced within the spirit of the invention as limited only by the scope of the appended claims.

What is claimed is:

1. A process for preparing a precooked, dehydrated product comprising: adjusting the temperature of a slurry of gelatinized starch into the range of activity exhibited by amylase; contacting sufficient of said amylase with said slurry to completely hydrolyze said gelatinized starch; combining a quantity of a slurry of non-hydrolyzed starch with a quantity of a slurry of said completely hydrolyzed starch wherein the combined quantities of ingredients create a maltose concentration of about 14% based on total weight of slurry; and drying said combined slurry to provide said dehydrated product.

2. A process in accordance with claim 1 wherein the ratio of said non-hydrolyzed starch to said gelatinized starch is about 1:2 by weight.

3. A process in accordance with claim 1 wherein said slurry of gelatinized starch is obtained by heating a slurry of ungelatinized starch to a temperature of at least about 160° F for a period of time sufficient to produce substantially complete gelatinization.

4. A process in accordance with claim 1 wherein said non-hydrolyzed starch comprises non-gelatinized starch.

5. A process in accordance with claim 3 wherein said non-gelatinized starch is combined with said temperature adjusted gelatinized starch prior to said enzyme contact.

6. A process in accordance with claim 2 wherein said non-hydrolyzed starch slurry is gelatinized simultaneously with said gelatinized starch slurry, but separated therefrom prior to said temperature adjustment and enzyme contact.

7. A process in accordance with claim 2 wherein said heating is sufficient to completely inactivate the natural enzymes in said cereal starch.

8. A process in accordance with claim 1 wherein the cereal grain of said starch slurry is selected from rice, oat, barley, corn, wheat, and mixtures thereof.

* * * * *